US00RE42629E

(19) United States
(12) Reissued Patent
Jones et al.

(10) Patent Number: US RE42,629 E
(45) Date of Reissued Patent: Aug. 23, 2011

(54) WEAR ASSEMBLY FOR A DIGGING EDGE OF AN EXCAVATOR

(75) Inventors: Larren F. Jones, Aloha, OR (US); Robin Morton, legal representative, Anchorage, AK (US); Jennifer Harp, legal representative, Tigard, OR (US); Randall Jones, legal representative, Tigard, OR (US); Patrick Jones, legal representative, Beaverton, OR (US); Jeffrey Jones, legal representative; Robert E. McClanahan, Portland, OR (US); Hezekiah R. Holland, Anchorage, AK (US)

(73) Assignee: ESCO Corporation, Portland, OR (US)

(21) Appl. No.: 09/368,503

(22) Filed: Aug. 5, 1999

Related U.S. Patent Documents

Reissue of:

(64) Patent No.: 5,653,048
Issued: Aug. 5, 1997
Appl. No.: 08/554,158
Filed: Nov. 6, 1995

(51) Int. Cl.
*E02F 9/28* (2006.01)

(52) U.S. Cl. ..... 37/452; 37/455; 37/450

(58) Field of Classification Search ..... 37/446, 37/449, 450, 451, 452, 453, 454, 455, 456, 37/458; 172/772, 772.5, 713, 753; 403/16, 403/19, 20, 22, 374.1, 374.2, 374.3, 374.4, 403/374.5, 319

See application file for complete search history.

(56) References Cited

U.S. PATENT DOCUMENTS

| | | | |
|---|---|---|---|
| 775,770 | A | 11/1904 | Herrod, Jr. |
| 1,485,879 | A | 3/1924 | Puge |
| 1,544,222 | A | 6/1925 | Crosby |
| 1,697,538 | A | 1/1929 | Mucy |
| 1,788,350 | A | 12/1930 | Watts |
| 1,868,247 | A | 7/1932 | Page |
| 1,885,326 | A | 11/1932 | Brune |
| 2,167,425 | A | 7/1939 | Page |
| 2,311,463 | A | 2/1943 | Page |
| 2,385,395 | A | 9/1945 | Baer |
| 2,393,708 | A | 1/1946 | Page |
| 2,919,506 | A | 1/1960 | Larsen |
| 2,996,291 | A | 8/1961 | Krekeler |
| 3,345,765 | A | 10/1967 | Petersen |
| 3,357,117 | A | 12/1967 | Petersen |
| 3,371,437 | A | 3/1968 | Wilson et al. |
| 3,388,488 | A | 6/1968 | Duplessis |
| 3,426,459 | A | 2/1969 | Petersen |
| 3,537,735 | A | 11/1970 | Hawk |
| 3,572,785 | A | 3/1971 | Larson |

(Continued)

FOREIGN PATENT DOCUMENTS

GB 2111558 7/1983

*Primary Examiner* — Christopher J. Novosad
(74) *Attorney, Agent, or Firm* — Steven P. Schad

(57) ABSTRACT

A wear assembly for attaching to a digging edge of an excavator includes a boss, a wear member and a lock. The boss is fixed to the excavator and defines a T-shaped coupling structure. The adapter includes a rearwardly extending mounting leg and a forwardly extending working end. The leg includes a T-shaped slot adapted to be received over the T-shaped structure of the boss. The adapter leg further includes an opening for receiving a lock. The lock includes an adjustment assembly for eliminating any looseness which may exist between the adapter and the boss.

138 Claims, 8 Drawing Sheets

U.S. PATENT DOCUMENTS 3,685,177 A 8/1972 Hahn et al.
3,762,079 A 10/1973 Lukavich et al.
3,841,007 A 10/1974 Howarth et al.
3,896,569 A 7/1975 Thompson et al.
3,919,792 A 11/1975 Hahn et al.
3,974,579 A 8/1976 Black et al.
3,995,384 A 12/1976 Wood
4,006,544 A 2/1977 Stepe
4,205,469 A 6/1980 Johansson et al.
4,233,761 A 11/1980 Ryerson
4,267,653 A 5/1981 Hahn et al.
4,317,300 A 3/1982 Emrich et al.
4,329,798 A 5/1982 Edwards
4,433,496 A 2/1984 Jones et al.
4,449,309 A 5/1984 Hemphill
4,457,380 A 7/1984 Curry
4,501,079 A 2/1985 Hahn et al.
4,577,423 A 3/1986 Hahn
4,642,920 A 2/1987 Lehnhoff
4,748,754 A 6/1988 Schwappach
RE33,042 E 9/1989 Emrich
4,899,830 A 2/1990 Maguina-Larco
4,965,945 A 10/1990 Emrich
5,005,304 A 4/1991 Briscoe et al.
5,016,365 A 5/1991 Robinson
5,052,134 A 10/1991 Bierwith
5,056,243 A 10/1991 Sprunger et al.
5,063,695 A 11/1991 Briscoe et al.
5,063,696 A 11/1991 Smith
5,088,214 A 2/1992 Jones
5,241,765 A 9/1993 Jones et al.
5,311,681 A 5/1994 Ruvang et al.
5,325,615 A 7/1994 Hutchins et al.
5,331,754 A 7/1994 Ruvang
5,337,495 A 8/1994 Pippins
5,410,826 A 5/1995 Immel et al.
5,417,518 A 5/1995 Bierwith
5,435,084 A 7/1995 Immel
5,438,774 A 8/1995 Fletcher et al.
5,452,529 A 9/1995 Neuenfeldt et al.
5,465,512 A 11/1995 Livesay et al.
5,553,409 A 9/1996 Irving
5,564,508 A 10/1996 Renski
5,634,285 A 6/1997 Renski
5,638,621 A * 6/1997 Keech et al. ..... 37/446
5,784,813 A * 7/1998 Balassa et al. ..... 37/455
5,806,215 A * 9/1998 Matthews
5,868,518 A * 2/1999 Chesterfield et al. .. 403/374.3 X
5,909,962 A * 6/1999 Livesay et al.
5,926,982 A * 7/1999 Keech et al. ..... 37/455
5,937,550 A * 8/1999 Emrich ..... 37/358
5,964,547 A * 10/1999 Brinkley ..... 37/456

* cited by examiner

WEAR ASSEMBLY FOR A DIGGING EDGE OF AN EXCAVATOR

Matter enclosed in heavy brackets [ ] appears in the original patent but forms no part of this reissue specification; matter printed in italics indicates the additions made by reissue.

FIELD OF THE INVENTION

The present invention pertains to a wear assembly for the digging edge of excavating equipment, and in particular, to an adapter which is mechanically attached to such excavating equipment.

BACKGROUND OF THE INVENTION

Excavating teeth and other wear members have long been mounted along the digging edge of buckets and other excavating equipment to break up the ground and enhance the digging operation. As can be appreciated, the wear members used along the digging edge are often placed in harsh working conditions and are thus subjected to a high degree of wearing.

In order to minimize the size of the part needing frequent replacement, excavating teeth are ordinarily formed as a plurality of integrally connected parts. An excavating tooth usually comprises an adapter, a point, and a lock pin for securing the point to the adapter. The adapter has a rear mounting end which is configured for attachment to the digging edge of an excavator and a forwardly projecting nose for mounting the point. The point is a tapered member provided with a forward earth-penetrating end and a rearwardly opening socket adapted to be received over the adapter nose. Although the points wear out more frequently, the adapters are also subjected to wearing and periodic replacement. As can be appreciated, the adapters must not only be capable of being firmly secured to the excavator to prevent undesired loss of the tooth during use, but it is desirable that they also be capable of being readily removed and installed by operators in the field.

A number of different approaches have been developed for securing wear members, such as adapters, to the digging edge of a bucket. U.S. Pat. No. 4,577,423 to Hahn provides an example of an adapter that is welded to the lip of a bucket. As to be expected, welding functions to securely attach the adapter to the bucket. However, the replacement of welded adapters is typically performed at a shop rather than in the field. The time and difficulty required to remove and install such welded adapters has proven to be a significant deterrent.

U.S. Pat. No. 4,267,653 to Hahn et al. describes an example of a mechanically attached adapter. As shown in this patent, mechanically attached adapters are frequently held to a bucket by the combination of a C-shaped clamp and a wedge. The wedge must be fit very tightly between the clamp and the adapter in order to securely hold the adapter to the bucket. Typically, the wedge is inserted into the assembly by repeated blows with a heavy sledge hammer. As can be appreciated, this is an onerous and time-consuming task for field workers, especially to achieve the final inch of movement needed to mount the assembly. Further, the wedge even when tightly inserted often becomes loose under heavy loading, which thus risks loss of the tooth. Finally, these assemblies require a hole to be formed in the bucket lip, which reduces the lip's strength and integrity.

U.S. Pat. No. 5,088,214 to Jones discloses another arrangement for mechanically attaching a wear member to the lip of a bucket. According to this construction, the wear member is matingly slipped over a T-shaped boss that has been welded to the bucket lip. A rigid locking block is fit within an opening defined in the top of the wear member to prevent undesired removal of the wear member from the lip. While this construction avoids the formation of a hole in the bucket lip, it is not suitable for use in attaching all types of wear members to any kind of bucket. For instance, larger buckets provided with beveled lips tend to generate large forces on an adapter which could in some circumstances cause instability in the mounting assembly. Further, the assembly lacks means for eliminating looseness that may exist between the wear member and the boss.

SUMMARY OF THE INVENTION

The wear assembly of the present invention enables the wear member to be securely attached to the digging edge of an excavator without the need for welding of the wear member or, in the preferred construction, forming a hole in the excavator's edge. Moreover, the assembly has sufficient stability to amply support adapters on a bucket lip formed with a beveled ramp. Nevertheless, despite the durability of the wear assembly, the wear members can still be easily removed or installed when replacement of the member becomes necessary.

In accordance with one aspect of the invention, a wear assembly includes a wear member which releasably attaches to a boss that is fixed to an excavator. The wear member includes a leg which extends rearwardly over the front edge of the excavator. A T-shaped structure is formed along the inner side of the leg for attachment to the boss. The complementary T-shaped coupling structures of the wear member and the boss prevent dislodgement of the wear member under load. The wear member also has front and rear bearing surfaces for resisting the applied loads during use.

In another aspect of the present invention, the boss is formed with a first surface which lies against the excavator and a second surface which forms a T-shaped coupling structure for receiving a wear member. The boss further includes a front bearing face for bracing the wear member and a rear bearing face for abutting a lock member to prevent removal of the wear member. In the preferred construction, a clamp section is formed along the first surface to wrap about the front digging edge of the excavator.

In accordance with another aspect of the invention, an opening for receiving a lock is formed through the leg of the wear member. The opening has a generally T-shaped configuration with a stem portion and a cross portion. The stem portion extends longitudinally from the rear end of the leg to the lateral cross portion of the opening. The body of the lock sets between the rear end of the boss and the rear wall of the cross portion in order to prevent removal of the wear member from the boss. An adjustment assembly extends through the body to eliminate any looseness which may exist between the wear member and the boss.

In accordance with another aspect of the invention, a deflector can be fixed to the excavator at a position behind the wear member. The removal of a wear member from the boss can frequently be a difficult task due to the compaction of fines around the parts. However, a lock member with an adjustment assembly can be easily used with a deflector to slide the wear member forwardly from the boss.

BRIEF DESCRIPTION OF THE INVENTION

DETAILED DESCRIPTION OF THE INVENTION

The present invention pertains to a wear member, such as an adapter, which is mechanically attached to the digging edge of an excavator. While wear members in accordance with the present invention can be secured to a number of different excavators, the present application for illustration purposes discusses only the use of adapters secured to an excavating bucket. Further, operation of the equipment will cause the present wear assemblies to assume many different orientations. Nevertheless, for purposes of explanation, the components of the wear assemblies are at times described in regard to relative directions such as up and down. These directions should be understood with respect to the orientation of the wear assembly as shown in FIG. 2, unless stated otherwise.

Figure 2:
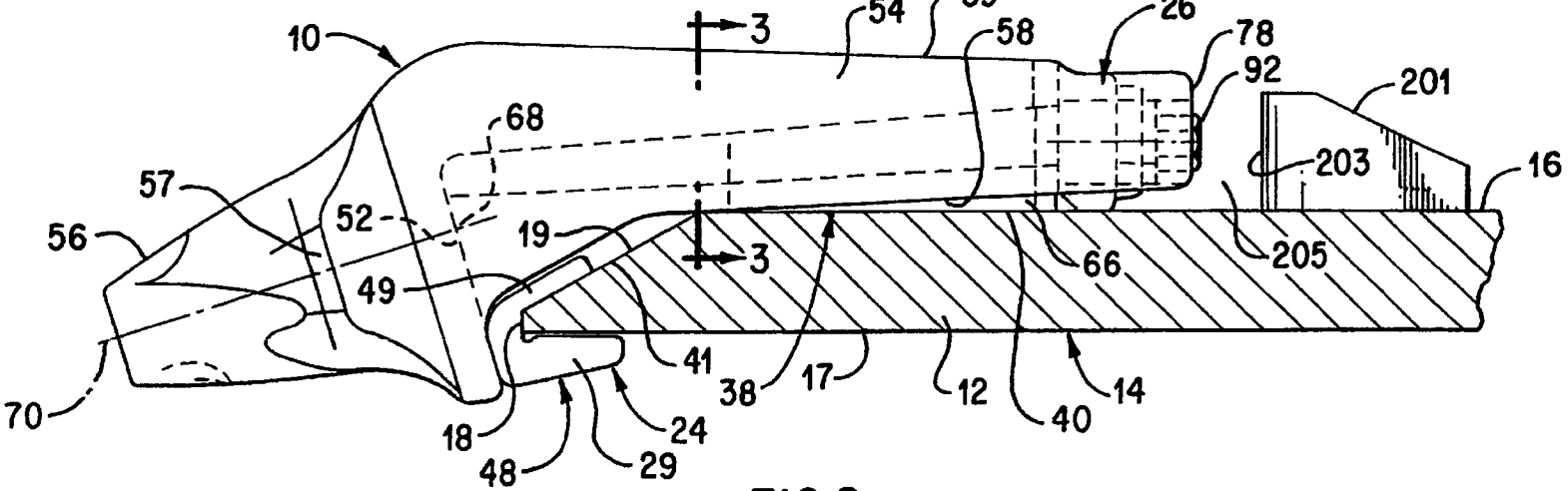
FIG. 2 is a side elevational view of the wear assembly.
Figure 3:
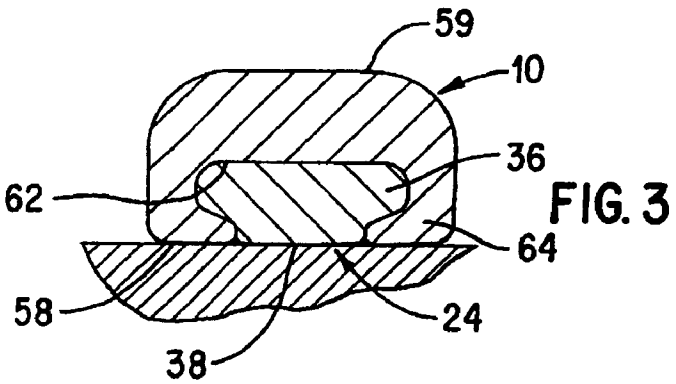
FIG. 3 is a cross-sectional view taken along line 3-3 in FIG. 2.

An adapter 10 in accordance with the present invention is particularly designed for attachment to the front lip 12 of a bucket 14 (FIG. 2). The lip includes an upper or inside surface 16, a lower or outside surface 17, a front edge face 18, and a beveled ramp 19 that interconnects inside surface 16 with front edge face 18. Adapter 10 is secured to lip 12 through the use of a boss 24 and a lock member 26.

Boss 24 is generally a J-shaped member with a pair of legs 28, 29 which wrap around the lip of bucket 14 (FIGS. 4-8). Upper leg 28 has a body 32 and a lateral flange 34 which together form a T-shaped structure along the top of the leg. The rear end of leg 28 forms a substantially flat, vertical wall 36 which functions to abut lock member 26 as discussed below; although wall 36 could have a concave or convex shape. The inner surface 38 of leg 28 includes a rear segment 40 which preferably lies against inside surface 16 and a front segment 41 which lies against beveled ramp 19. Nonetheless, in some circumstances, leg 28 may be fixed to the outside surface of the excavating equipment.

Figure 4:
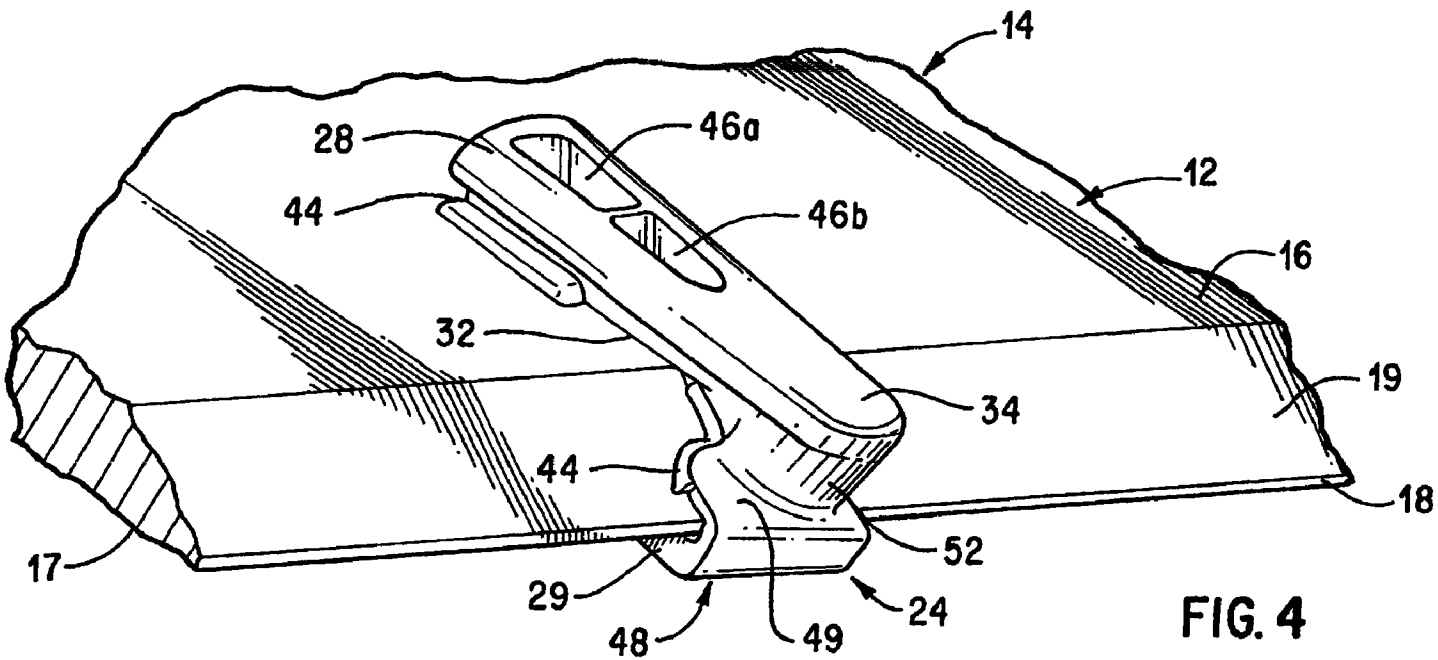
FIG. 4 is a perspective view of a boss in accordance with the present invention.
Figure 5:
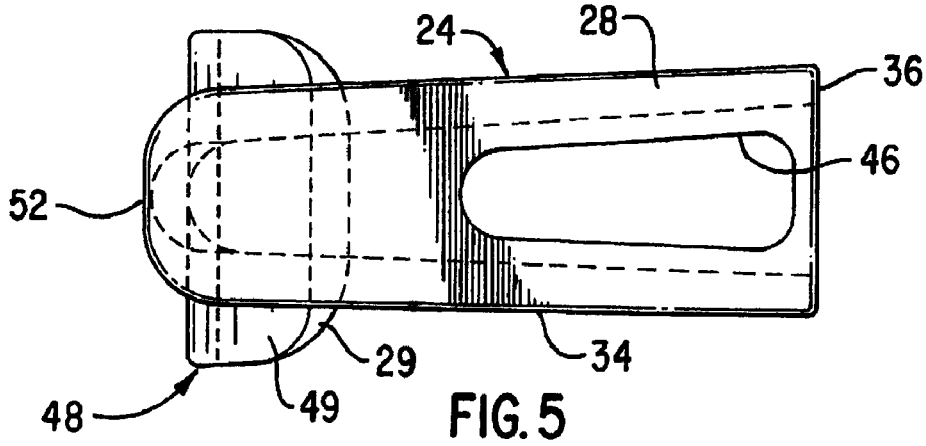
FIG. 5 is a top plan view of the boss.
Figure 6:
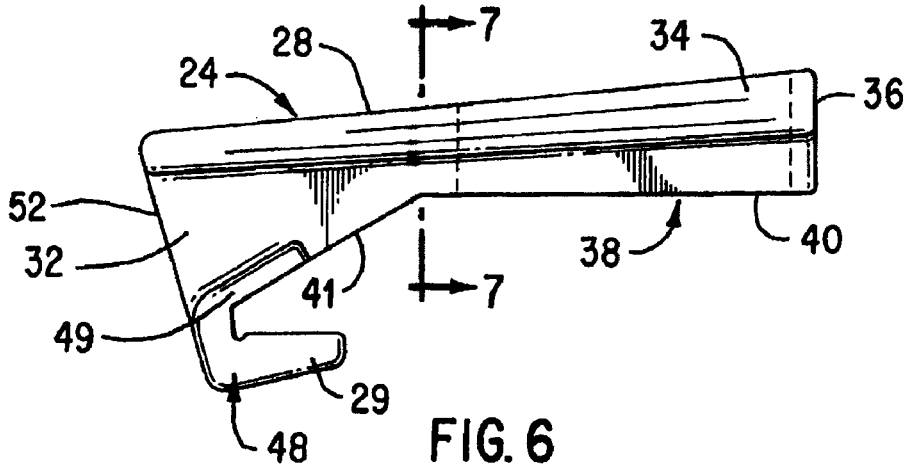
FIG. 6 is a side elevational view of the boss.
Figure 7:
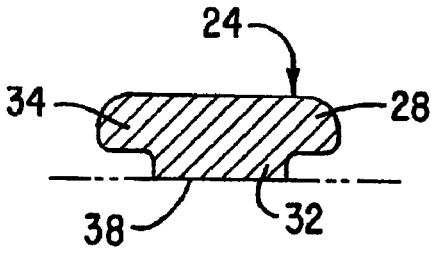
FIG. 7 is a cross-sectional view of the boss taken along line 7-7 in FIG. 6.
Figure 8:
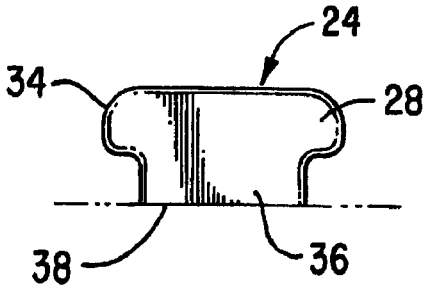
FIG. 8 is an rear elevational view of the boss.

In the preferred construction, weld beads 44 are secured along at least portions of the rear and front segments 40, 41 to fixedly attach the boss to the bucket lip (FIG. 4). At least one hole 46 is preferably provided through upper leg 28 to define an additional area for welding the boss to the bucket (FIGS. 5 and 6). A pair of holes 46a, 46b (or other arrangements) could alternatively be formed if desired. For illustration purposes, this arrangement of holes has been shown in the perspective view of the boss (FIG. 4). Since the boss is substantially enveloped by the adapter, as described below, wearing of the boss is minimized. As a result, the boss requires only infrequent replacement. Welding of the boss to the lip is therefore not a significant deterrent to the operators in the field, unlike the welding of adapters which need frequent replacement. Alternatively, the boss can be fixed to the lip of the bucket by other means, such as bolting or being integrally cast with the lip construction. Also, particularly with cast bosses, lower leg 29 can be omitted.

To form the T-shaped construction, body 32 of boss 24 is narrower than flange 34. The lower portion of leg 28, however, again widens at the front end of the boss to form with leg 29 a clamping section 48. In the preferred construction, the width of clamping section 48 has substantially the same width as adapter 10. Clamping section 48 includes a top brace 49 and lower leg 29 intersected to form a generally V-shape configuration. The widened clamping section provides increased support for holding the boss to the bucket, and enhanced support in resisting loads imposed on the adapter. Further, lower leg 29 is short and positioned close to adapter 10 so as to limit the exposure and wearing of the member. Although not illustrated, lower leg 29 is in the preferred construction welded to outside surface 27. The front of boss 24 is shaped to define a bearing face 52 that matingly abuts adapter 10 as discussed below. Due to the connection of body 32 with flange 34 and with clamping section 48, bearing face 52 has a generally I-shaped configuration (FIG. 4).

Adapter 10 includes a rearwardly extending leg 54 and a forwardly projecting nose 56 (FIGS. 1-3 and 9-12). Nose 56 is preferably formed as disclosed in U.S. Pat. No. 4,965,945 to Emrich, which is hereby incorporated by reference. Nevertheless, many other nose structures could be used as desired. In use, the socket defined in the point (not shown) is matingly received over the nose. In the illustrated embodiment, a lock pin (not shown) is passed along shoulder 57 to secure the point (not shown) to the adapter.

Adapter 10 includes only a single leg 54 which preferably extends along the inside surface of the bucket. Ordinarily, the outside leg of atypical bifurcated adapter experiences much more wearing than the inside leg. By eliminating the need for a leg along the outside of the bucket, the adapters of the present invention generally enjoy a longer usable life. Nonetheless, in some circumstances, leg 54 can be secured along the outside surface of the excavating equipment. Leg 54 has an inner surface 58 and an outer surface 59. A T-shaped slot 62 opens along the inner surface 58 to matingly engage with the T-shaped configuration defined along the top of boss 24 (FIGS. 3, 11, 12 and 18). To install adapter 10 on a bucket, the adapter is slid rearwardly onto boss 24 such that slot 62 is received over and around flange 34. As an alternative, in certain circumstances, the T-shaped structures of the boss and the adapter may be formed as rail segments with spaced apart gaps therebetween as disclosed in U.S. Pat. No. 5,241,765 to Jones et al., which is hereby incorporated by reference. As discussed in this patent, the use of segments enables the wear member to be installed and removed with minimum longitudinal sliding of the adapter along the boss.

As can be appreciated, flange 34 prevents movement of the adapter upward and away from inside surface 16 of bucket 14. While the marginal edges 64 of inner surface 58 generally follow the contour of bucket lip 12, the marginal edges do not have any significant engagement with the lip. In the preferred construction, a gap 66 is formed between most of the marginal edges 64 of adapter 10 and bucket 14 to permit sufficient space for the placement of weld beads 44.

Figure 10:
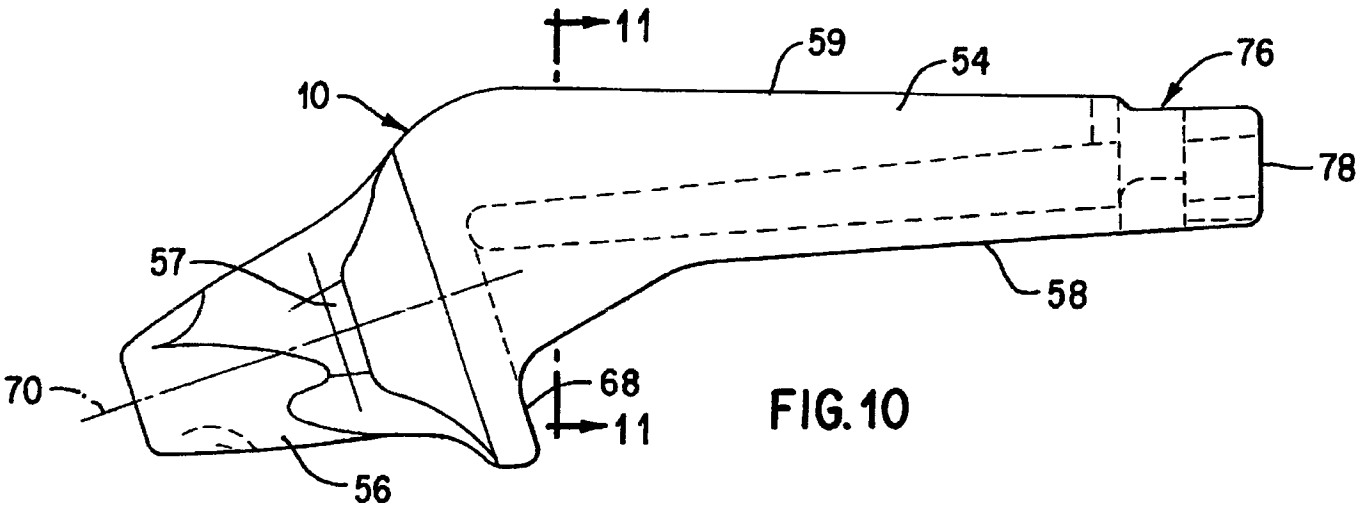
FIG. 10 is a side elevational view of the adapter.

A bearing face 68 is positioned at the front end of slot 62 to abut against bearing face 52 at the front of boss 24 (FIGS. 2 and 10). In the preferred construction, bearing faces 52, 68 are oriented to be substantially perpendicular to the axis 70 of nose 56. With this arrangement, the magnitude of the moment forces to be resisted by the bearing surfaces can be minimized. Nevertheless, the angular orientation of bearing surfaces 52, 68 could be varied considerably depending upon the desired application. Further, bearing faces 52, 68 both preferably extend below nose 56 in order to better resist downwardly applied forces on the front of the point. Moreover, this downward extension of the bearing surfaces forms a front covering for clamp section 48 of boss 24 which, in turn, reduces wearing of the boss. Finally, though bearing faces 52, 68 are generally planar, they could also be concave or convex in shape.

Figure 1:
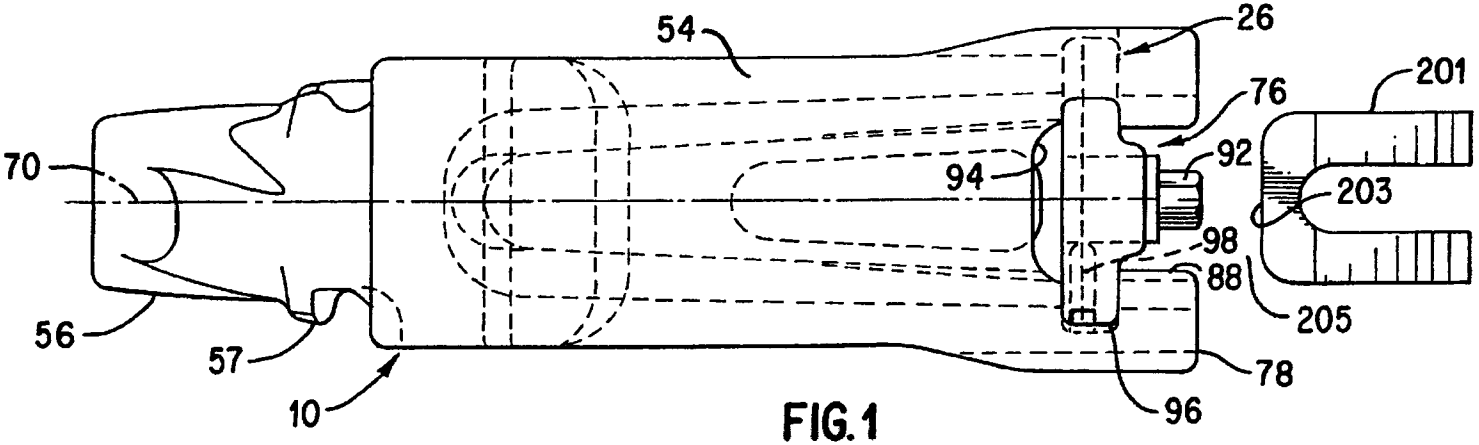
FIG. 1 is top plan view of a wear assembly in accordance with the present invention.
Figure 9:
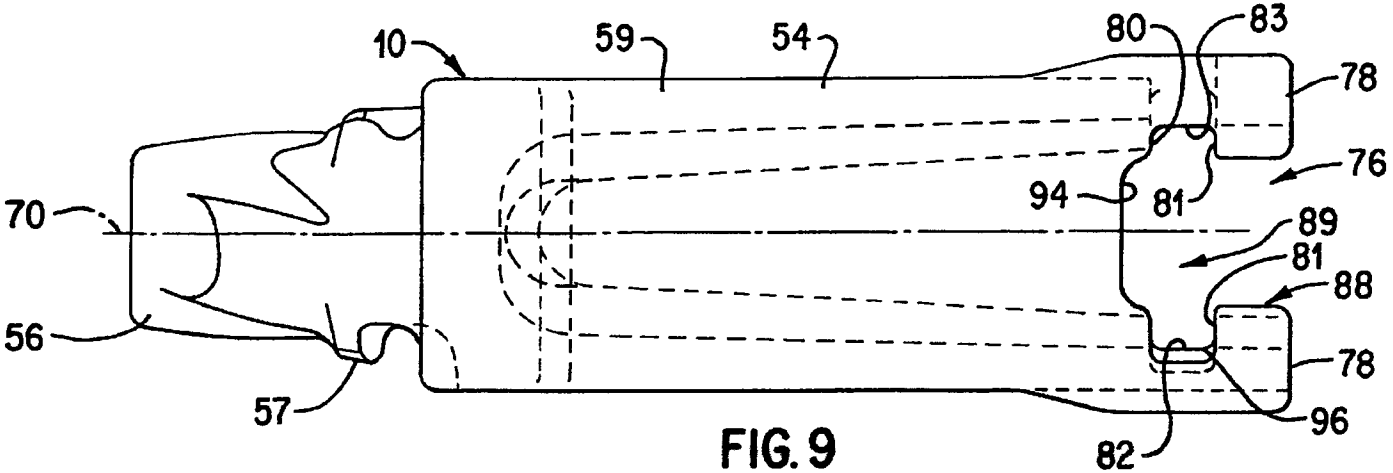
FIG. 9 is a top plan view of an adapter in accordance with the present invention.

An opening 76 is provided in leg 54 to extend from outer surface 59 to inner surface 58 and communicate with slot 62 (FIGS. 1 and 9). Opening 76 is positioned near rear end 78 of leg 54, and rearward of rear bearing face 36 of boss 24 when adapter 10 is assembled on the boss. In the preferred embodiment, opening 76 has a generally T-shaped configuration which includes a stem portion 88 and a cross portion 89. The cross portion is defined by a pair of opposing front and rear walls 80, 81 and a pair of side walls 82, 83. Stem portion 88 extends longitudinally between cross portion 89 and rear wall 78. As discussed more fully below, stem portion 88 provides clearance for the adjustment assembly 92 of lock member 26. Front wall 80 of opening 76 also preferably includes a central recess 94 to provide clearance for the front of the adjustment assembly as needed.

Figure 12:
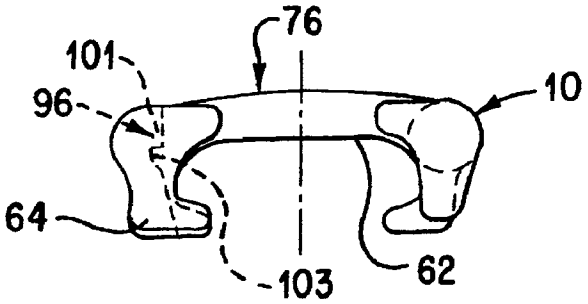
FIG. 12 is a rear elevational view of the adapter.
Figure 11:
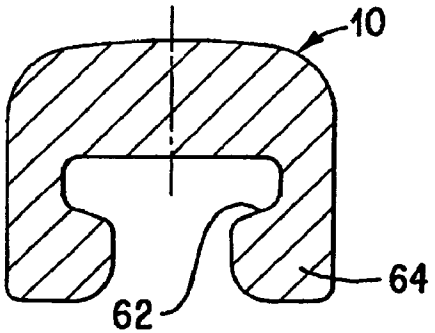
FIG. 11 is a cross-sectional view of the adapter taken along line 11-11 in FIG. 10.
Figure 18:
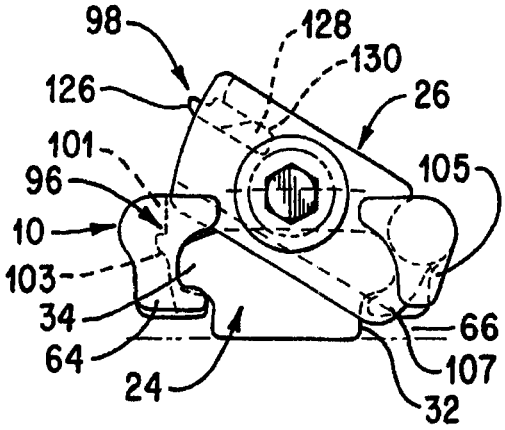
FIG. 18 is a rear elevational view of the lock member partially inserted into an adapter assembly in accordance with the present invention.

One of the side walls 82 of the cross portion of opening 76 defines a keeper 96 to cooperate with a latch 98 for releasably retaining lock member 26 in the opening (FIGS. 12 and 18). Keeper 96 is preferably formed by a tab 101 which overlies a recess 103 adapted to receive latch 98. The other side wall 83 of opening 76 has an arcuated configuration which conforms with the arc of a circle to form a pivot support for inserting and removing the lock. Leg 54 includes a space 105 below side wall 83 for receiving one end 107 of lock member 26 as described below.

Figure 14:
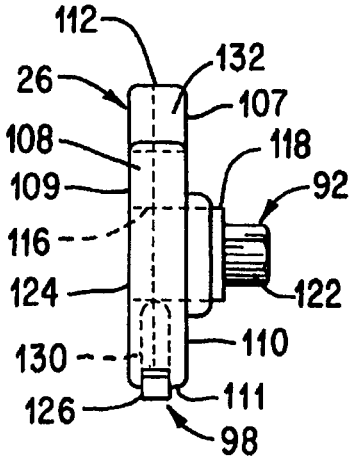
FIG. 14 is a top plan view of a lock member in accordance with the present invention.
Figure 15:
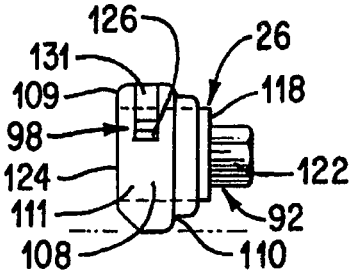
FIG. 15 is a side elevational view of the lock member.
Figure 16:
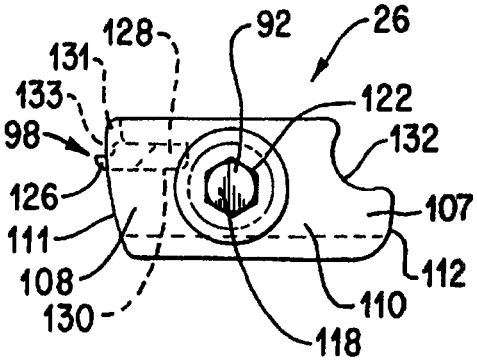
FIG. 16 is a rear elevational view of the lock member.

Lock member 26 functions to prevent adapter 10 from being slid axially off boss 24. Lock member 26 has a rigid block-shaped body 108 defined by a front wall 109, a rear wall 110, a first end wall 111, and a second end wall 112 (FIGS. 14-16). Body 108 of lock 26 is received into cross portion 89 of opening 76 such that its front wall 109 opposes rear wall 36 of boss 24, and its rear wall 110 opposes rear wall 81 of adapter 10 (FIG. 1). This engagement structure effectively prevents the adapter from being moved forwardly along the boss.

Lock member 26 further includes a latch 98 (FIGS. 14, 16 and 18). Latch 98 preferably includes a rigid tang 126 and an elastomeric member 128. Latch 98 is mounted within an opening 130 in end wall 111 such that tang 126 projects outward therefrom. To facilitate removal of the lock from opening 76, a groove 131 is preferably defined in lock 26 along the top of end wall 111 to enable a tool (e.g., a screw driver) to engage a shoulder 133 on tang 126 and retract latch 98 from keeper 96 (FIGS. 15 and 16). Second end wall 112 includes an arcuate depression 132 which is adapted to matingly engage the arcuated end wall 83, and enable lock member 26 to pivotally swing into and out of opening 76. When lock member 26 is inserted into opening 76 end portion 107 is fit into space 105 to provide a larger abutting area (FIG. 18).

Lock 26 further includes an adjustment assembly 92 for eliminating any looseness that may exist between the adapter and the boss (FIGS. 14-16). In the preferred construction, adjustment assembly 92 includes a threaded bore 116 that extends through lock member 26 to receive a threaded plug 118. Plug 118 includes flats 122 on its rear end to facilitate engagement with a wrench or the like and a front bearing face 124. In use, plug 118 is advanced through bore 116 until bearing face 124 engages rear wall 36 of boss 24 and rear wall 110 of lock member 92 abuts rear wall 81 of opening 76. Plug 118 is preferably not tightened beyond engagement of the abutting walls to avoid unnecessary loading of the plug 118. Moreover, since the plug is only loaded with compressive forces, the assembly has considerable durability and strength. As the adapter and boss wear, looseness may develop between the two parts. To eliminate this looseness, plug 118 is advanced forwardly until front face 124 of plug 118 again abuts rear wall 36 of boss 24 and rear wall 110 abuts rear wall 81 of opening 76.

Figure 17:
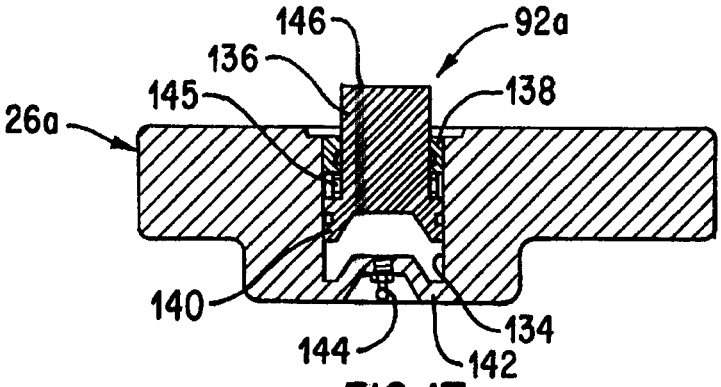
FIG. 17 is a sectional view of an alternative lock member in accordance with the present invention.

Alternatively, plug 118 can be replaced with an adjustment assembly 92a which relies upon fluid pressure to eliminate any existing looseness in the assembly (FIG. 17). More specifically, in this embodiment, lock member 26a includes a cylindrical cavity 134 in lieu of threaded bore 116. A piston 136 is slidably received in cavity 134 for movement toward and away from rear wall 36 of boss 24. A retaining ring 138 is threadedly attached in cavity 134 to form a stop against which annular shoulder 140 of piston 136 engages upon maximum extension. A rear wall 142 closes the cavity on its rear end and supports grease fitting 144. Grease fitting 144 is preferably set in a recess 143 for protection. Grease or other fluid is fed into cavity 134 to drive piston 136 forward. A coil spring 145 is received around piston 136 to retract the piston when the grease is drawn out of cavity 134.

Figure 13:
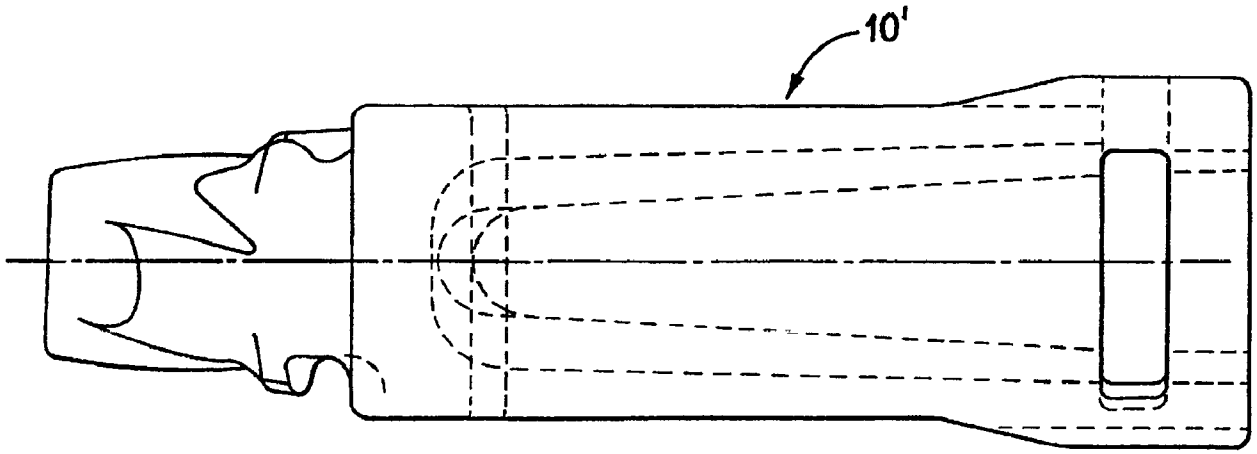
FIG. 13 is a top plan view of an alternative adapter in accordance with the present invention.
Figure 19:
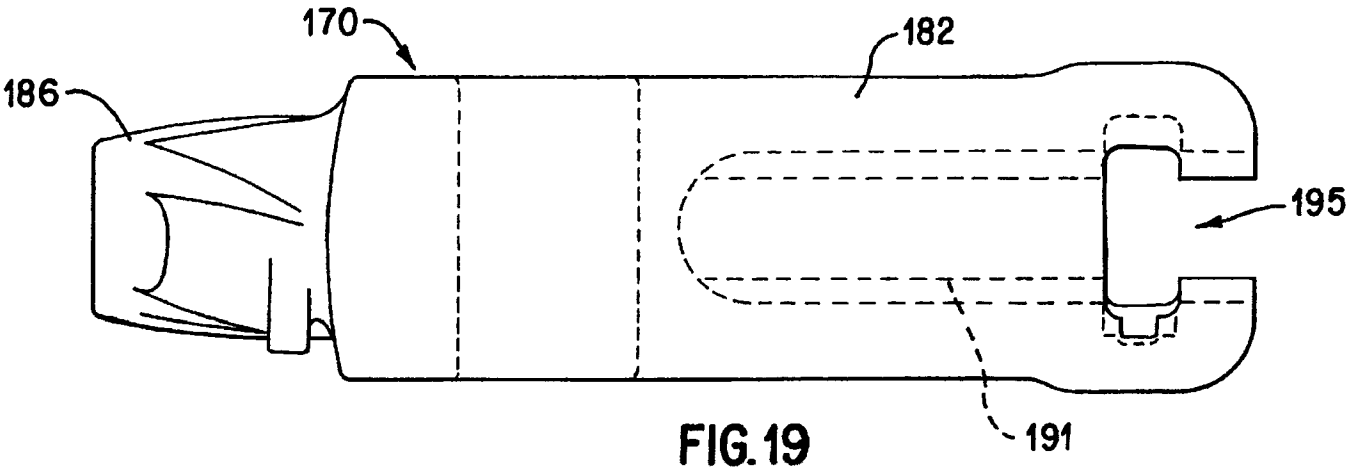
FIG. 19 is a top plan view of another alternative adapter in accordance with the present invention.
Figure 20:
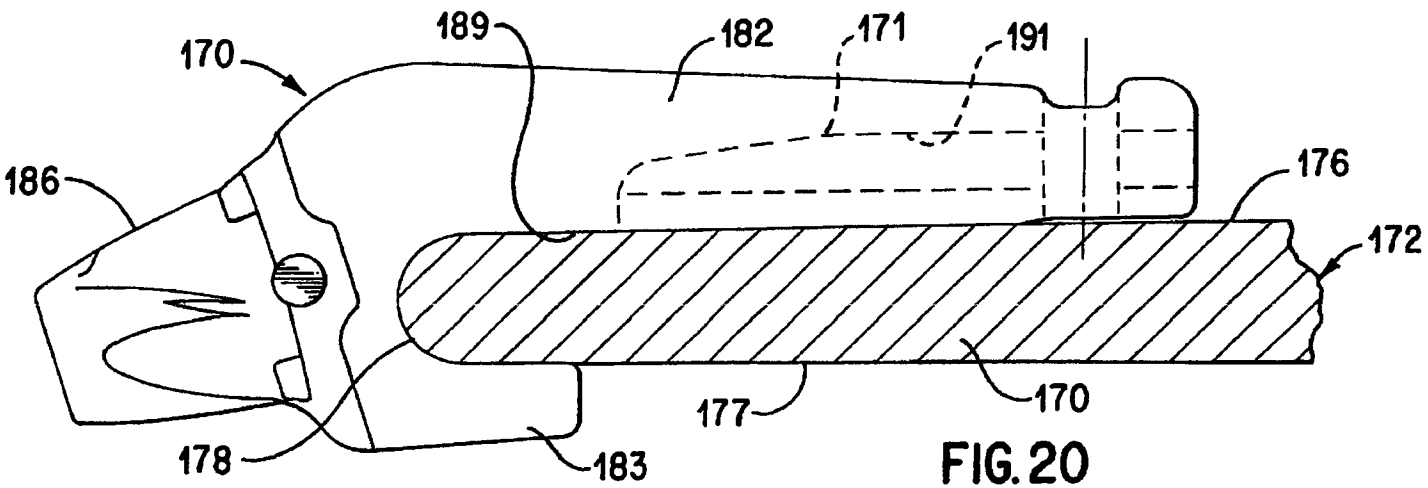
FIG. 20 is a side elevational view of the other alternative adapter on the digging edge of an excavator.

The use of a lock member 26, 26a with an adjustment assembly 92, 92a can also be used with other adapter constructions. For instance, with repositioning of the grease fitting, lock 26a could be set in an opening of an adapter 10' without a stem portion (FIG. 13). As another example, the wear assembly can include an adapter 170 and a boss 171 which attaches to a bucket 172 (FIGS. 19 and 20). The bucket lip 174 includes generally parallel inside and outside surfaces 176, 177, and a rounded front edge 178.

Adapter 170 includes a pair of legs 182, 183 which extend along inside surface 176 and outside surface 177, respectively, and a nose 186 (FIGS. 19 and 20). Although nose 186 preferably has the same construction as nose 56 of adapter 10, it is shown with a nose in accordance with U.S. Pat. No. RE33042, incorporated herein by reference, to illustrate that different noses can be used. Top leg 182 has a lower surface 189 that lies against inside surface 176 of lip 174. A T-shaped slot 191 opens in lower surface 189 to receive a complementary T-shaped boss 171. The rear end of leg 182 includes an opening 195 which has the same construction as opening 76.

Figure 21:
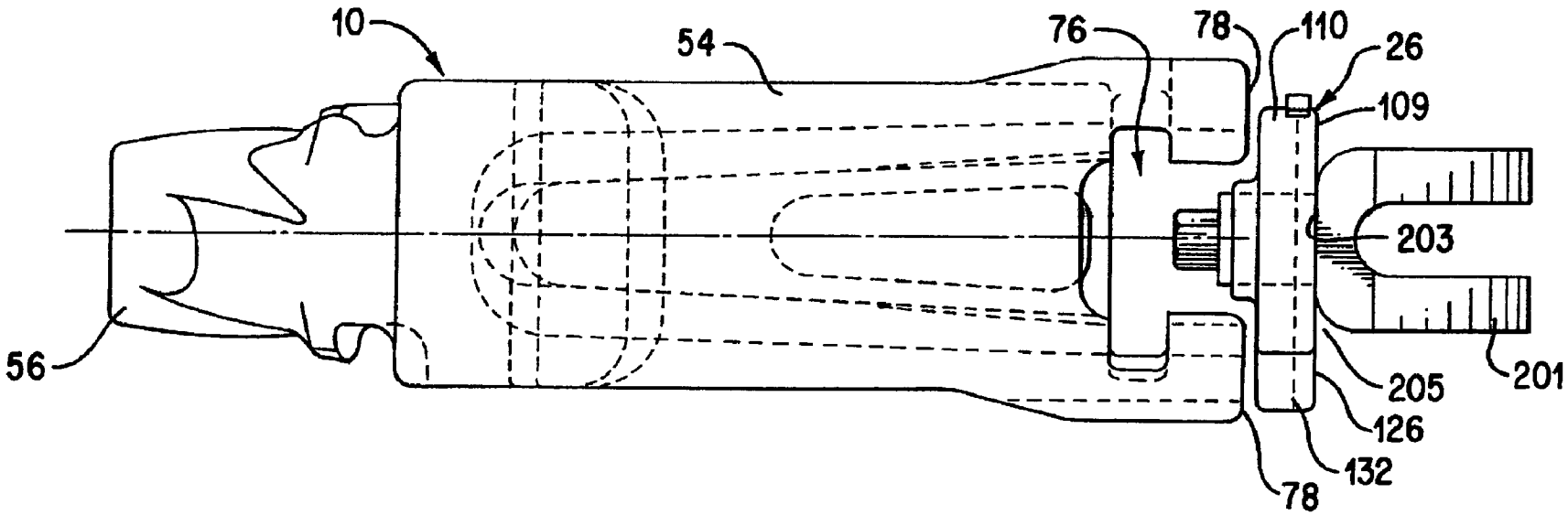
FIG. 21 is a top plan view of a wear assembly in accordance with the present invention with the lock member positioned for effecting removal of the wear member.

A deflector 201 (FIGS. 1-2 and 21) is preferably secured to inside surface 16 of bucket 14 (or alternatively bucket 172). Deflector 201 is preferably a U-shaped member provided with a forward bracing surface 203; although other structural members could be used. The deflector is used to ease the removal of adapter 10 in the field. In particular, lock 26 (or 26a) is removed from opening 76, reversed, and set within the gap 205 defined between rear end 78 of adapter 10 and bracing surface 203 of deflector 201. The plug 118 is then advanced so that its bearing face 124 pushes against deflector 201 to move lock member 26 forwardly into engagement with rear end 78 of adapter 10. Continued advancement of plug 118 then functions to push adapter 10 from boss 24. Alternatively, other expansion devices (e.g., a turnbuckle) could be used with the deflector in lieu of lock 26.

While use of a lock with an adjustment assembly is desired, it is not essential to the present invention. The adapters 10, 170 can be amply secured to boss 24, 171 by a rigid lock without an adjustment assembly (not shown) that simply prevents forward movement of the adapter. Under these conditions, the lock member and corresponding opening would be essentially the same as discussed in U.S. Pat. No. 5,088,214 to Jones, which is hereby incorporated by reference. An example of such an adapter 10' is shown in FIG. 13. Nevertheless, a lock without an adjustment assembly could still be used in openings 76, 195.

The above-discussion concerns the preferred embodiments of the present invention. Various other embodiments as well as many changes and alterations may be made without departing from the spirit and broader aspects of the invention as defined in the claims.

We claim:

1. A wear assembly for attachment to a digging edge of an excavator, the digging edge having an inside face and an outside face, said wear assembly comprising:

a boss having a first surface adapted to be fixed to the digging edge, a second surface adapted to be positioned remote from the digging edge and having a T-shaped structure, and a bearing face extending between said first and second surfaces;

a wear member having at least one rearwardly extending leg and a forwardly projecting working end, said leg having a T-shaped structure releasably coupled to said T-shaped structure of said boss, said leg further including an opening extending therethrough; and a rigid lock received into said opening, said lock having a first face adapted to oppose and engage said bearing face of said boss and a second face adapted to oppose and engage a wall of said opening whereby said lock secures said wear member to said boss, said lock further including an adjustment assembly selectively movable to vary the relative positions of said first and second faces to eliminate looseness which may exist in mounting said wear member to the digging edge.

2. A wear assembly in accordance with claim 1, in which said opening has a generally T-shaped configuration with a stem portion that extends longitudinally and opens in said rear end and a lateral cross portion which includes said wall to oppose said lock.

3. A wear assembly in accordance with claim 1, in which said lock includes a body and said adjustment assembly includes a threaded bore extending through said body and a threaded plug operatively received into said bore, wherein said plug includes the first adapted to engage said bearing face of said boss.

4. A wear assembly in accordance with claim 1, in which said lock includes a body and said adjustment assembly includes a bore extending substantially through said body and a piston axially movable in said bore under fluid pressure, wherein said piston includes the first face adapted to engage said bearing face of said boss.

5. A wear assembly in accordance with claim 1, further including a deflector fixed to the digging edge rearward of said boss, said lock member being positionable between said deflector and said wear member to move said adapter forwardly along said boss upon advance of said adjustment assembly.

6. A wear assembly for attachment to a digging edge of an excavator, the digging edge having an inside face and an outside face, said wear assembly comprising:

a boss having a first surface adapted to be fixed to the digging edge, a second surface adapted to be positioned remote from the digging edge and having a T-shaped structure, and rear and front bearing faces extending between said first and second surfaces;

a wear member comprising a rear mounting end and a forwardly projecting working end, said working end having a longitudinal axis, said mounting end including a leg having a longitudinal axis inclined relative to said longitudinal axis of said working end and adapted to extend rearwardly over the digging edge, said leg having an inner surface adapted to face the digging edge and a T-shaped structure extending longitudinally along said inner surface for coupling to said T-shaped structure of said boss, a bearing face extending transversely to said T-shaped coupling structure and generally perpendicular to said longitudinal axis of said working end whereby said bearing face abuts said front bearing face of the boss, and a lock receiving opening extending through said leg and in communication with said T-shaped structure of said wear member; and a lock received into said opening to oppose said rear bearing face of said boss and a wall of said opening to thereby secure said wear member to said boss.

7. A wear assembly in accordance with claim 6, in which said working end includes a nose for mounting a point of an excavating tooth.

8. A wear assembly in accordance with claim 7, wherein said nose includes a mounting portion which is enveloped by the point for securing the point to the digging edge, and wherein said bearing face extends in a direction away from said T-shaped coupling structure to a position beyond said mounting portion of said nose.

9. A wear assembly in accordance with claim 6, further including a deflector fixed to the digging edge spaced rearward of said boss such that expansion means is positionable between said deflector and said adapter for moving said adapter forwardly along said boss.

10. A wear member for attachment to a digging edge of an excavator, the digging edge having an inside face and an outside face, said wear member comprising a rear mounting end and a forwardly projecting working end, said mounting end including a leg adapted to extend rearwardly over the digging edge, said leg having an inner surface adapted to face the digging edge and a T-shaped coupling structure extending longitudinally along said inner surface for coupling to a boss fixed to the digging edge, a bearing face in communication with said T-shaped coupling structure and extending transversely to said T-shaped coupling structure in a direction generally away from said T-shaped coupling structure to a position beyond said inner surface at least approximately as far as the extension of said working end in the same direction whereby said bearing face is adapted to abut a front end of the boss, and a lock receiving opening extending through said leg in communication with said T-shaped coupling structure, said opening including a pair of longitudinal side walls, one of said side walls including a keeper for releasably retaining a lock.

11. A wear member in accordance with claim 10, in which said working end includes a nose for mounting a point of an excavating tooth.

12. A wear member in accordance with claim 11, in which said nose has a longitudinal axis and said bearing face is substantially perpendicular to said longitudinal axis.

13. A wear member in accordance with claim 12, in which said mounting end includes only a single rearwardly extending leg.

14. A wear member in accordance with claim 10, in which said mounting end includes only a single rearwardly extending leg.

15. A wear member in accordance with claim 10, in which said working end has a longitudinal axis and said bearing face is substantially perpendicular to said longitudinal axis.

16. A wear member in accordance with claim 10, in which said T-shaped coupling structure is a T-shaped slot.

17. A wear member in accordance with claim 10, in which said opening has a generally T-shaped configuration with a stem portion that extends longitudinally and opens in a rear end of said leg and a cross portion which extends laterally a greater distance the said stem portion.

18. A wear member in accordance with claim 10, in which said other of said pair of opening side walls is arcuated to form a pivot support for the lock.

19. A wear member in accordance with claim 10, in which said keeper includes a tab which overlies a recess in said one side wall.

20. A wear member for attachment to a digging edge of an excavator, the digging edge having an inside face and an outside face, said wear member comprising a rear mounting end and a forwardly projecting working end having a longitudinal axis, said mounting end including a leg adapted to extend rearwardly over the digging edge, said leg having a longitudinal axis which is inclined relative to said longitudinal axis of said working end, said leg having an inner surface adapted to face the digging edge and a T-shaped coupling structure extending longitudinally along said inner surface for coupling to a boss fixed to the digging edge, a bearing face extending transversely to said T-shaped coupling structure and substantially perpendicular to the longitudinal axis of said working end whereby said bearing face is adapted to abut a front end of the boss, and a lock receiving opening extending through said leg and in communication with said T-shaped coupling structure.

21. A wear member in accordance with claim 20, in which said working end includes a nose for mounting a point of an excavating tooth.

22. A wear member in accordance with claim 21, in which said bearing face extends beyond said nose in a direction away from said T-shaped coupling structure.

23. A wear member in accordance with claim 20, in which said working end is formed by tapering walls having rearward ends proximate said mounting end, and said bearing face extends in a direction away from said T-shaped coupling structure to a position beyond said rearward ends of said tapering walls.

24. A wear member in accordance with claim 20, in which said T-shaped coupling structure is a T-shaped slot.

25. A wear member in accordance with claim 20, in which said opening includes a pair of longitudinal walls, wherein one of said walls includes a keeper for releasably retaining a latch of a lock.

26. A wear member for attachment to a digging edge of an excavator, the digging edge having an inside face and an outside face, said wear member comprising a rear mounting end and a forwardly projecting working end, said mounting end including at least one leg adapted to extend rearwardly over the digging edge, said leg having an outer surface, an inner surface and a rear end wall, said inner surface being adapted to face said digging edge and having a T-shaped coupling structure for coupling to a boss fixed to the digging edge, and a lock receiving opening extending through said leg, said opening having a generally T-shaped configuration with a longitudinal stem portion opening in said rear end wall and a cross portion extending laterally beyond said stem portion.

27. A wear member in accordance with claim 26, in which said working end includes a nose for mounting a point of an excavating tooth.

28. A wear member in accordance with claim 26, in which said T-shaped coupling structure is a T-shaped slot.

29. A wear member in accordance with claim 26, in which one of said side walls of said opening includes a keeper for releasably retaining a latch of a lock.

30. A wear member in accordance with claim 29, in which said other of said pair of side walls of said opening is arcuated to form a pivot support for the lock.

31. A wear member in accordance with claim 29, in which said keeper includes a tab which overlies a recess in said one side wall.

32. A wear member in accordance with claim 26, in which said mounting end includes only a single rearwardly extending leg.

33. A wear member in accordance with claim 26, in which said mounting end includes a pair of rearwardly extending legs spaced apart to receive therebetween the digging edge.

34. A boss for attaching a wear member to a digging edge of an excavator, the digging edge having an inside face and an outside face, said boss comprising a first surface adapted to be fixed to the digging edge, and a second surface adapted to be positioned remote from the digging edge, said second surface having a longitudinally extending T-shaped coupling structure, said first surface having a clamping section adapted to wrap around the digging edge and engage front portions of the inside face and the outside face, and a front bearing face and a rear bearing face each extending between said first surface and said second surface.

35. A boss in accordance with claim 34, wherein said T-shaped coupling structure includes a body extending generally perpendicular to the digging edge and a lateral flange, and wherein said clamping section extends laterally beyond said body.

36. A boss in accordance with claim 35, in which said clamping section extends laterally beyond said flange.

37. A boss in accordance with claim 34, in which said front and rear bearing faces are generally planar.

38. A boss in accordance with claim 34, which further includes an opening extending from said first surface to said second surface to enable welding of said boss to the digging edge.

39. A boss in accordance with claim 34, in which said first surface includes a front segment and a rear segment, wherein said front segment extends at an inclination to said rear segment to engage a beveled ramp on the inside face of the digging edge.

40. A boss for attaching a wear member to a digging edge of an excavator, the digging edge having an inside face, an outside face and a beveled ramp, said boss comprising a first surface adapted to be fixed to the digging edge and a second surface adapted to be positioned remote from the digging edge, said first surface having a rear segment and a front segment inclined relative to one another, said front segment being adapted to be fixed to the beveled ramp of the digging edge, said second surface having a longitudinally extending T-shaped coupling structure, and a front bearing surface and a rear bearing face each extending between said first surface and said second surface.

41. A lock member for securing a wear member to a boss wherein the boss is fixed to a digging edge of an excavator, said lock member comprising a block shaped body having a rigid construction and including front and rear faces and a pair of side faces, one of said side faces including a latch adapted to cooperate with a keeper for retaining said lock member in a opening of the wear member, and an adjustment assembly having an longitudinal axis and extending through said body generally orthogonally to said front and rear faces, said adjustment assembly having a front bearing face that is axially movable to eliminate any looseness existing between the boss and the wear member.

42. A lock member in accordance with claim 41, in which said adjustment assembly includes a threaded bore extending through said body and a threaded plug operatively received into said bore, wherein said plug includes said front bearing face.

43. A lock member in accordance with claim 42, in which said plug further includes a plurality of flats to facilitate turning in said bore.

44. A lock member in accordance with claim 41, in which said adjustment assembly includes a bore extending substantially through said body and a piston axially movable in said bore under fluid pressure, wherein said piston includes said front bearing face.

45. A lock member in accordance with claim 41, in which the other of said side faces includes an arcuated depression which forms a pivot support.

46. A lock member in accordance with claim 41, in which said latch includes a rigid tang projecting outward from said one side face and an elastomeric member resiliently supporting said tang.

47. A method of removing a wear member from a boss fixed to a digging edge of an excavator, said method comprising:

providing a wear assembly including a boss fixed to the digging edge of an excavator, a deflector fixed to the digging edge rearward of said boss, a wear member, and a lock member, said boss and said wear member including complementary T-shaped structures coupled together to releasably hold said wear member to said boss, and said lock member preventing removal of said wear member from said boss when installed;

removing said lock member from said wear assembly;

providing an expansive force between said wear member and said deflector to force said wear member forwardly along said T-shaped structure of said boss; and removing said wear member from said boss.

48. A method in accordance with claim 47, wherein said lock member includes an adjustment assembly which is selectively movable, and wherein said adjustment assembly of said lock member is used to apply said expansive force.

49. A method in accordance with claim 48, wherein said adjustment assembly includes a piston which is advanced under fluid pressure to move said wear member.

50. A method in accordance with claim 48, wherein said adjustment assembly includes a threaded plug which is advanced to move said wear member.

51. A wear assembly for attachment to a digging edge of an excavator comprising:

a wear member having a rearwardly extending leg and a forwardly projecting working end, said leg having a longitudinal slot which opens in an inner side of said leg, said slot having an internal shoulder, and an opening extending through said leg and in communication with said slot, said opening including a bearing face;

a boss adapted to be fixed to the digging edge, said boss including a bearing face and a longitudinal tongue, said tongue being axially received into said slot of said wear member and including a shoulder to engage said internal shoulder of said slot to prevent relative movement between said wear member and said boss in directions other than longitudinal; and a rigid lock received into said opening and including a first face engaged with said bearing face of said opening, a second face engaged with said bearing face of said boss, and an adjustment assembly selectively movable to vary the relative positions of said first and second faces to eliminate looseness which may exist in mounting said wear member to the digging edge.

52. A wear member for attachment to a boss fixed to a digging edge of an excavator, said wear member comprising a forwardly projecting working end having a longitudinal axis and a rearwardly extending leg inclined relative to the longitudinal axis of said working end, said leg having a longitudinal slot which opens is an inner side of said leg and a lock receiving opening extending through said leg and in communication with said slot, said slot having an internal shoulder and being adapted to receive a complementary tongue of a boss to prevent relative movement therebetween in directions other than longitudinal, said wear member further including a first bearing face in said opening to engage a lock and a second bearing face exposed in said slot to engage the boss, said second bearing face extending transversely to said slot and substantially perpendicular to said longitudinal axis of said working end.

53. A wear member for attachment to a boss fixed to a digging edge of an excavator, said wear member comprising a forwardly projecting working end and a rearwardly extending leg, said leg having a longitudinal slot which opens in an inner side of said leg and a lock receiving opening extending through said leg and in communication with said slot, said slot having an internal shoulder and being adapted to receive a complementary tongue of a boss to prevent relative movement therebetween in directions other than longitudinal, said wear member further including a first bearing face in said opening adapted to engage a lock and a second bearing face exposed in said slot adapted to engage the boss, said second bearing face being generally transverse to said slot and projecting outward from said slot at least approximately as far as the extension of said working end in the same direction.

54. A wear member for attachment to a boss fixed to a digging edge of an excavator, said wear member comprising a forwardly projecting working end and a rearwardly extending leg having a transverse rear end wall said leg having a longitudinal slot which opens in an inner side of said leg and said rear end wall, and a lock receiving opening extending through said leg and in communication with said slot, said slot having an internal shoulder and being adapted to receive a complementary tongue of a boss to prevent relative movement therebetween in directions other than longitudinal, and said opening being open in said rear end wall including a lateral shoulder in said leg spaced from said rear end wall to define a bearing surface for a lock to secure the wear member to the boss.

*55. A wear assembly for attachment to a digging edge of an excavator, the digging edge having an inside face and an outside face, said wear assembly comprising:*

*a boss having a mounting surface adapted to be fixed to the digging edge, a T-shaped coupling structure, and a bearing face extending transverse to said mounting surface;*

*a wear member having at least one rearwardly extending leg and a forwardly projecting working end, said leg having a T-shaped coupling structure releasably coupled to said T-shaped structure of said boss, and an opening extending therethrough; and*

*a lock received into said opening to hold said wear member to said boss, said lock having a first face adapted to oppose said bearing face of said boss, a second face adapted to oppose a wall of said opening, and an adjustment assembly selectively movable to vary the relative positions of said first and second faces to thereby apply forces to the wear member and the boss that tend to move the wear member so as to tighten the mounting of the wear member on the boss.*

*56. A wear assembly in accordance with claim 55 in which said opening has a generally T-shaped configuration with a stem portion that extends longitudinally and opens in a rear end of the leg of the wear member, and a lateral cross portion which includes said wall to oppose the lock.*

*57. A wear assembly in accordance with claim 55 in which the adjustment assembly includes a threaded member which is turned to adjust the relative spacing between the first face and the second face.*

*58. A wear assembly in accordance with claim 55 in which the wear member includes a keeper structure in the opening, and the lock includes a projection received in the keeper structure to hold the lock in the opening.*

*59. A wear assembly for attachment to a digging edge of an excavator, the digging edge having an inside face and an outside face, said wear assembly comprising:*

*a boss having a mounting surface adapted to be fixed to the digging edge, a T-shaped coupling structure, and a bearing face extending laterally to said mounting surface;*

*a wear member having at least one rearwardly extending leg and a forwardly projecting working end, said leg having a T-shaped coupling structure releasably coupled to said T-shaped structure of said boss, and an opening extending therethrough; and*

*a lock received into said opening to hold said wear member to said boss, said lock having a first part with a first face adapted to oppose said bearing face of said boss, and a second part with a second face adapted to oppose a wall of said opening, said first part being threadedly connected to said second part for adjustment of said first face relative to said second face to thereby apply forces to the wear member and the boss that tend to move the wear member so as to tighten the mounting of the wear member on the boss.*

*60. A wear assembly in accordance with claim 59 in which said opening has a generally T-shaped configuration with a stem portion that extends longitudinally and opens in a rear end of the leg of the wear member, and a lateral cross portion which includes said wall to oppose the lock.*

*61. A wear assembly in accordance with claim 59 in which the wear member includes a keeper structure in the opening, and the lock includes a projection received in the keeper structure to hold the lock in the opening.*

*62. A mount for attaching a wear member to a digging edge of an excavator, the digging edge having an inside face and an outside face, said mount comprising a rear structure having a mounting surface adapted to be fixed to the digging edge, a longitudinally extending T-shaped coupling structure adapted to mate with a complementary formation of the wear member, and a rearwardly facing bearing surface adapted to abut a lock and thereby hold the wear member to the mount, and a front structure adapted to wrap around the digging edge and be attached to front portions of the inside face and the outside face, said front structure including at least one surface adapted to abut the wear member and resist unwanted movement of the wear member relative to the mount.*

*63. A mount in accordance with claim 62 in which the front structure is wider than the mounting surface of the rear surface.*

*64. A mount in accordance with claim 63 in which the T-shaped coupling structure includes a lateral flange, and the front structure is wider than the lateral flange.*

*65. A mount in accordance with claim 63 in which said at least one surface of the front structure faces forwardly to abut an inner surface of the wear member.*

*66. A mount in accordance with claim 63 wherein the rear and front structures are formed as a one-piece member.*

*67. A lock adapted to be received into an opening in a wear member for securing the wear member to a boss fixed to a digging edge of an excavator, said lock comprising opposite front and rear bearing faces wherein the front face presses against the boss and the rear face presses against the wear member to maintain coupling of the wear member to the boss, an adjustment assembly for selectively varying the relative positions of the front and rear bearing faces, and a projection to cooperate with a keeper structure to hold the lock in the opening in the wear member.*

*68. A lock adapted to be received into an opening in a wear member for securing the wear member to a boss fixed to a digging edge of an excavator, said lock comprising opposite front and rear bearing faces wherein the front face is adapted to oppose the boss and the rear face is adapted to oppose the wear member to maintain coupling of the wear member to the boss, an adjustment assembly for selectively varying the relative positions of the front and rear bearing faces, and a projection to cooperate with a keeper structure to hold the lock in the opening in the wear member, wherein the adjustment assembly includes a threaded bore extending through a body and a threaded plug operatively received into the bore, and the plug includes the front bearing face.*

*69. A lock in accordance with claim 68 in which the body includes an arcuate depression in a side thereof to form a pivot support.*

*70. A lock adapted to be received into an opening in a wear member for securing the wear member to a boss fixed to a digging edge of an excavator, said lock comprising opposite front and rear bearing faces wherein the front face is adapted to oppose the boss and the rear face is adapted to oppose the wear member to maintain coupling of the wear member to the boss, an adjustment assembly for selectively varying the relative positions of the front and rear bearing faces, and a projection to cooperate with a keeper structure to hold the lock in the opening in the wear member, wherein the projection includes a rigid tang and an elastomeric member resiliently supporting the tang.*

*71. A method of mounting a wear member to an excavator provided with a boss having a first longitudinal T-shaped coupling member, the wear member having a front working structure and at least one rearwardly extending leg formed with a second longitudinal T-shaped coupling structure and an opening in communication with the second T-shaped coupling structure, the method comprising:*

*sliding the wear member rearwardly onto the boss so that the first and second T-shaped coupling structures mate with each other;*

*inserting a lock with opposite, spaced apart first and second bearing faces into the opening such that the first bearing face opposes a wall of the boss and the second bearing face opposes a wall of the wear member;*

*selectively adjusting the spacing between the first and second bearing faces to tighten the mounting of the wear member onto the excavator.*

*72. A method in accordance with claim 71 in which the lock includes a threaded member which includes the first bearing face on one end, wherein the adjusting of the space between the bearing faces is accomplished by turning of the threaded member.*

*73. A lock adapted to be received into an opening in a wear member for securing the wear member to a boss fixed to a digging edge of an excavator, said lock comprising opposite front and rear bearing faces wherein the front face is adapted to oppose the boss and the rear face is adapted to oppose the wear member to maintain coupling of the wear member to the boss, an adjustment assembly for selectively varying the relative positions of the front and rear bearing faces, and a projection to cooperate with a keeper structure to hold the lock in the opening in the wear member, and further including a first part with an opening and a second part movably received in the opening, wherein one of the front and rear bearing faces are defined on each of the first and second parts.*

*74. A wear assembly for an excavator having a lip with an inner surface, an outer surface, and a front edge face for digging, the wear assembly comprising:*

*a boss adapted to be fixed to an excavator lip, the boss including (i) an inner surface to be fixed to the lip, the inner surface having a front portion and a rear portion generally aligned with each other, and being bent so that the front portion extends generally transverse to the rear portion with the rear portion being along one of the faces of the lip and the front portion being along the front edge face, (ii) a first shoulder that extends generally away from the front edge face, the first shoulder having a holding surface that faces generally toward the lip, and (iii) a first bearing surface;*

*a wear member including (i) a second shoulder that is placed between the holding surface and the lip to hold the wear member and prevent release of the wear member in a direction away from the lip, and (ii) an opening having a second bearing surface; and*

*a lock received into the opening in the wear member so as to oppose the first and second bearing surfaces to prevent disconnection of the first and second shoulders and thereby retain the wear member to the boss.*

*75. A wear assembly in accordance with claim 74 in which the boss includes a support surface, and the wear member includes an abutting surface to abut the support surface of the boss to restrict rearward movement of the wear member, wherein the abutting surface and the support surface are each generally transverse to the extension of the first shoulder away from the front edge face.*

*76. A wear assembly in accordance with claim 75 in which the support surface is arcuate.*

*77. A wear assembly in accordance with claim 74 in which the boss is a one-piece member.*

*78. A wear assembly in accordance with claim 77 wherein the boss wraps completely around the front edge face of the lip such that the inner surface extends along the inner and outer surfaces of the lip.*

*79. A wear assembly in accordance with claim 74 in which the first bearing surface is formed at a rear end of the boss.*

*80. A wear assembly in accordance with claim 74 in which the boss has a generally T-shaped coupling structure that includes the first shoulder.*

*81. A wear assembly in accordance with claim 80 in which the wear member has a generally T-shaped slot that includes the second shoulder, and the T-shaped coupling structure of the boss is received in the slot of the wear member.*

*82. A wear assembly in accordance with claim 74 further including a keeper to retain the lock in the opening.*

*83. A wear assembly in accordance with claim 82 in which the lock includes a retention portion movable between an operative position and a release position, wherein the retention portion in the operative position sets opposed to the keeper to retain the lock in opening.*

*84. A wear assembly in accordance with claim 74 in which the opening in the wear member includes a main portion and a stem portion, wherein the stem portion is narrower than the main portion and each of the main and stem portions extend completely through the wear member.*

*85. A wear assembly in accordance with claim 84 in which the stem portion opens in a rear surface of the wear member.*

*86. A wear assembly in accordance with claim 74 in which the lock includes a first face that abuts the bearing surface of the boss, a second face that abuts a wall of the opening in the wear member, and an adjustment assembly that moves the first and second faces relative to each other to tighten the fit to the lock between the wear member and the boss.*

*87. A wear assembly in accordance with claim 86 in which the lock further includes a main body and a movable plug, wherein one of the first and second faces is defined on each of the body and plug.*

*88. A wear assembly in accordance with claim 86 in which the adjustment assembly includes a threaded connection.*

*89. A wear assembly for an excavator having a lip with a front edge face for digging, the wear assembly comprising:*

*a boss adapted to be fixed to an excavator lip, the boss including a front structure with an inner surface that is bent and fixed along a face of the lip and the digging edge, a rear structure having a first shoulder that extends generally away from the digging edge, and a bearing surface, wherein the rear structure includes a rearwardly extending leg that substantially overlies the lip, and the front structure wraps around the digging edge to define a second leg;*

*a wear member including a second shoulder that engages the first shoulder to hold the wear member to the boss and prevent release of the wear member in a direction perpendicular to the extension of the front shoulder, and an opening; and*

*a lock received into the opening in the wear member and in contact with the bearing surface of the boss to prevent disconnection of the first and second shoulders and thereby retain the wear member to the boss.*

*90. A wear assembly in accordance with claim 89 in which the wear member further includes a forwardly extending working portion.*

*91. A wear assembly in accordance with claim 90 in which the working portion is a nose for holding an excavating point.*

*92. A wear assembly for an excavator having a lip with a front edge face for digging, the wear assembly comprising:*

*a boss adapted to be fixed to an excavator lip, the boss including a coupling structure having a holding surface in opposed relation to the lip of the excavator, a bearing surface, and a front portion that wraps around the digging edge;*

*a wear member received over the boss and including retaining members that are received between the holding surfaces and the lip of the excavator to retain the wear member to the boss in directions other than a longitudinal direction, and an opening; and*

*a lock received into the opening in the wear member and in contact with the bearing surface of the boss to prevent disconnection of the first and second shoulders and thereby retain the wear member to the boss.*

*93. A wear assembly in accordance with claim 92 in which the front portion of the boss further includes a front bearing surface that abuts the wear member to restrict movement of the wear member.*

*94. A wear assembly in accordance with claim 93 in which the front bearing surface is arcuate.*

*95. A wear assembly in accordance with claim 92 in which the boss is a one-piece member.*

*96. A wear assembly in accordance with claim 92 in which the holding surfaces are part of a generally T-shaped coupling structure.*

*97. A wear assembly in accordance with claim 96 in which the wear member has a generally T-shaped slot that receives the T-shaped coupling structure.*

*98. A wear assembly in accordance with claim 92 in which the wear member includes a keeper to retain the lock in the opening.*

*99. A wear assembly in accordance with claim 98 in which the lock includes a retention portion movable between an operative position and a release position, and the retention portion in the operative position sets opposed to the keeper to retain the lock in opening.*

*100. A wear assembly in accordance with claim 92 in which the opening in the wear member includes a main portion and a stem portion, wherein the stem portion is narrower than the main portion.*

*101. A wear assembly in accordance with claim 92 in which the lock includes a first face that abuts the bearing surface of the boss, a second face that abuts a wall of the opening in the wear member, and an adjustment assembly that moves the first and second faces relative to each other to tighten the fit to the lock between the wear member and the boss.*

*102. A wear assembly in accordance with claim 101 in which the lock further includes a main body and a movable plug, wherein one of the first and second faces is defined on each of the body and plug.*

*103. A wear assembly in accordance with claim 102, in which the plug is threadedly received in the main body.*

*104. A wear assembly for an excavator having a lip with a front edge face for digging, the wear assembly comprising:*

*a one-piece boss adapted to be fixed to an excavator lip, the boss including a front portion that wraps around the digging edge and forms a forwardly-facing bearing surface, a coupling structure with first shoulders extending away from the front edge face, and a rearwardly-facing bearing surface;*

*a wear member received over the boss and including a slot that engages with the coupling structure of the boss to permit only relative longitudinal movement between the wear member and the boss, an abutting surface to engage the forwardly-facing bearing face of the boss to limit rearward movement of the wear member relative to the boss, and an opening passing through the wear member; and*

*a lock received into the opening in the wear member and in contact with the rearwardly-facing bearing surface of the boss and a wall of the opening to prevent disconnection of the engaged slot and coupling structure.*

*105. A wear assembly in accordance with claim 104 in which the lock includes first and second bearing surfaces and an adjustment assembly selectively movable to vary the relative positions of the first and second bearing surfaces to eliminate looseness which may exist in mounting the wear member to the lip.*

*106. A wear assembly in accordance with claim 105 wherein the lock includes an adjustable plug that tightens the engaged of the wear member onto the excavator.*

*107. A wear assembly in accordance with claim 106 wherein the plug is threadedly received into a corresponding bore in the lock.*

*108. A wear assembly in accordance with claim 104 in which the opening in the wear member includes a main portion and a stem portion, wherein the stem portion is narrower than the main portion and opens in a rear portion of the wear member.*

*109. A wear member for mounting to an excavator having a lip with an inner face, an outer face, a front edge face and at least one boss fixed to the lip, the wear member comprising:*

*an inner surface to face the lip;*

*a longitudinal slot for axially receiving the boss therein, the longitudinal slot having a central portion that opens in the inner surface and being partially defined by holding surfaces extending laterally outward from the central portion, wherein the holding surfaces are generally facing away from the lip for engaging the boss to generally permit only relative longitudinal movement between the wear member and the boss;*

*an opening passing through the wear member for receiving a lock;*

*a first bearing surface associated with the opening and facing generally forward to engage the lock and thereby prevent removal for the wear member from the boss; and*

*a second bearing surface facing generally rearward to engage the boss and restrict rearward movement of the wear member on the boss;*

*the first and second bearing surfaces each being generally transverse to the longitudinal slot.*

*110. A wear member in accordance with claim 109 which further includes a rearwardly extending leg and a front working portion, wherein the second bearing surface is generally between the front working portion and the leg.*

*111. A wear member in accordance with claim 109 which further includes a keeper cooperating with a lock mechanism for holding the lock in the opening.*

*112. A one-piece boss to be fixed to an excavator lip having an inner face, an outer face and a front edge face for digging, wherein the boss is for mounting a wear member to the lip, the boss comprising (i) a coupling structure with shoulders extending rearwardly from the front edge face to engage a complementary structure of a wear member, (ii) an inner surface to be fixed to the lip, the inner surface having a front portion and a rear portion generally aligned with each other, and being bent so that the front portion extends generally transverse to the rear portion with the rear portion being along one of the faces of the lip and the front portion being along the front edge face, (iii) a forwardly facing first bearing surface to abut the wear member and resist rearwardly directed forces, and (iv) a rearwardly facing second bearing surface for contacting a lock securing the wear member to the boss, each of the first and second bearing surfaces being generally transverse to the extension of the shoulders extending from the front edge face.*

*113. A boss in accordance with claim 112 in which the first bearing surface is arcuate.*

*114. A boss in accordance with claim 112 in which the front portion wraps around the front edge face so that the inner surface extends along the inner and outer surfaces of the lip.*

*115. A boss for fixing to an excavator lip for mounting a wear member thereto, the boss including a rear structure adapted to mount along a first side of the lip, the rear structure including a coupling structure with shoulders extending rearwardly from the digging edge to engage complementary structure of a wear member and a rearwardly facing bearing face adapted to engage a lock holding the wear member to the boss, and a front structure adapted to engage an opposite side of the lip and the front of the digging edge, the front structure including at least one bearing surface adapted to abut the wear member and resist unwanted movement of the wear member relative to the boss.*

*116. A wear assembly for an excavator having a lip with an inner surface, an outer surface and a front edge face for digging, the wear assembly comprising:*

*a boss to be fixed to an excavator lip, the boss including a first shoulder spaced from the lip and a first bearing surface;*

*a wear member including a second shoulder that engages the first shoulder between the first shoulder and the lip to hold the wear member to the boss and prevent release of the wear member from the boss in a direction generally perpendicular to the lip, an opening, and a second bearing surface associated with the opening, wherein the first and second bearing surfaces face in opposite directions when the first and second shoulders are engaged; and*

*a lock received into the opening in the wear member, the lock being substantially contained to one side of the lip and between the first and second bearing surfaces to prevent disconnection of the first and second shoulders from each other and thereby retain the wear member on the boss, the lock having a first lock surface to oppose the first bearing surface, a second lock surface to oppose the second bearing surface, and an adjustment assembly selectively movable to vary the relative positions of the first and second bearing surfaces to thereby apply forces to the wear member and the boss that tend to tighten the mounting of the wear member on the boss.*

*117. A wear assembly in accordance with claim 116 wherein the boss includes a front structure that wraps around the front edge face of the lip.*

*118. A wear assembly in accordance with claim 116 wherein the lock includes a first part with an opening and a second part movably received in the opening, wherein one of the first and second bearing faces are defined on each of the first and second parts.*

*119. A wear assembly in accordance with claim 116 in which the lock includes a body with one wall that defines the first face and a threaded bore, and a threaded member threaded into the threaded bore, wherein the threaded member includes a wall that defines the second face.*

*120. A wear assembly for attachment along a lip of an excavator comprising:*

*a boss fixed to the lip and having a rear wall;*

*a wear member having (i) a forwardly projecting working end, (ii) a rearwardly extending leg having an inner side adapted to face the lip, a rear wall generally transverse to the inner side, and a longitudinal slot open in the inner side and the rear wall of the leg to receive the boss and thereby provide support to the position of the wear member on the lip, and (iii) a forwardly facing bearing surface; and*

*a lock placed in general alignment with the slot and maintained to one side of the lip for engagement with the rear wall of the boss and the bearing surface of the wear member to retain the wear member to the lip, the lock including a body having an axial hole extending generally parallel to the extension of the slot, and a threaded adjustment member threaded into the axial hole of the body such that rotation of the adjustment member causes axial movement of the adjustment member in the axial hole relative to the body in a direction generally parallel to the lip to expand the lock so as to press against the rear wall of the boss and the bearing surface of the wear member and thereby move the wear member rearward to thereby tighten the mounting of the wear member on the lip.*

*121. A wear assembly in accordance with claim 120 in which the body and adjustment member are threadedly coupled together.*

*122. A wear assembly in accordance with claim 121 in which the adjustment member is moved forwardly relative to the body to push against the boss and thereby tighten the mounting of the wear member on the lip.*

*123. A wear assembly in accordance with claim 120 in which the body includes a threaded bore and the adjustment member includes a threaded shank extending through the bore, wherein the shank extends generally parallel to the longitudinal slot in the wear member.*

*124. A wear assembly in accordance with claim 120 in which the body includes a first bearing surface that presses against a wall of the opening and the adjustment member includes a second bearing surface that presses against a wall of the boss.*

*125. A wear assembly in accordance with claim 120 in which the opening has a front portion and a rear portion, wherein the rear portion is narrower than the front portion and opens in the rear wall of the leg of the wear member, and the front portion includes at least one forwardly-facing bearing surface adjacent the rear portion to engage the lock.*

*126. A new assembly for attachment along a lip of an excavator comprising:*

*a boss fixed to the lip and having a front wall;*

*a wear member including (i) a forwardly projecting working end, (ii) a rearwardly extending leg having an inner side to face the lip, a rear wall generally transverse to the inner side, and a longitudinal slot open in the inner side and the rear wall of the leg to receive the boss and thereby provide support to the position of the wear member on the lip, (iii) an opening, and (iv) a transverse bearing surface at a front end of the slot extending generally parallel to the front wall of the boss to abut said front wall; and*

*a lock removably received into the opening to engage the wear member and the boss and thereby releasably retain the wear member to the lip.*

*127. A wear assembly in accordance with claim 126 in which the lock includes a body and an adjustment member movably secured to the body such that forward movement of the adjustment member relative to the body moves the wear member rearward to thereby tighten the mounting of the wear member on the lip.*

*128. A wear assembly in accordance with claim 127 in which the body and adjustment member are threadedly coupled together and positioned such that one presses against the boss and one presses against the wear member.*

*129. A wear assembly in accordance with claim 126 in which the opening has a front portion and a rear portion, wherein the rear portion is narrower than the front portion*

*and opens in the rear wall of the leg of the wear member, and the front portion includes at least one forwardly-facing bearing surface adjacent the rear portion to engage the lock.*

*130. A wear assembly for attachment along a lip of an excavator, the lip defining a front edge face for digging, the wear assembly comprising:*

*a boss fixed to the lip and having a front portion that wraps around the front edge face of the lip;*

*a wear member having a forwardly projecting working end, a rearwardly extending leg having an inner side adapted to face the lip, a rear wall generally transverse to the inner side, and a longitudinal slot open in the inner side and the rear wall of the leg to receive the boss and thereby provide support to the position of the wear member on the lip, and an opening extending through the wear member; and*

*a lock removably received into the opening to releasably retain the wear member to the lip.*

*131. A wear assembly in accordance with claim 130 in which the boss includes a front wall, and the wear member includes a front bearing surface extending generally parallel to the front wall of the boss for abutting said front wall.*

*132. A wear assembly in accordance with claim 131 in which the lock includes a body and an adjustment member movably secured to the body such that movement of the adjustment member relative to the body moves the wear member rearward to thereby tighten the mounting of the wear member on the lip.*

*133. A wear assembly in accordance with claim 132 in which the body and adjustment member are threadedly coupled together.*

*134. A wear assembly in accordance with claim 133 in which the body includes a threaded bore and the adjustment member is a threaded shank extending through the bore.*

*135. A wear assembly in accordance with claim 134 in which the body includes a bearing surface that presses against a wall of the opening and the adjustment member includes a bearing surface that presses against a wall of the boss.*

*136. A wear member for mounting on a front lip of an excavator having a fixed boss, the wear member comprising (i) a forwardly projecting working end, (ii) a rearwardly extending leg having an inner side to face the lip, a rear wall generally transverse to the inner side, and a longitudinal slot open in the inner side and the rear wall of the leg to receive the boss and thereby provide support to the position of the wear member on the lip, the slot including a rearwardly-facing bearing surface at a front end thereof and extending out of the slot for abutting against a front wall of the boss in face-to-face contact for resisting rearwardly directed loading on the wear member during use, and (iii) a lock receiving opening extending through the wear member and having a first forwardly-facing bearing surface extending generally transverse to the lip to contact the lock.*

*137. A wear member in accordance with claim 136 in which the opening has a front portion and a rear portion, wherein the rear portion is narrower than the front portion and opens in the rear wall of the leg of the wear member, and the front portion includes at least one forwardly-facing bearing surface adjacent the rear portion to engage the lock.*

*138. A wear member in accordance with claim 136 in which the working end includes a nose for mounting a point of an excavating tooth.*

* * * * *